United States Patent Office 3,350,388
Patented Oct. 31, 1967

3,350,388
PROCESS FOR THE MANUFACTURE OF
1-GLYCOSYL-5-AZACYTOSINES
František Šorm and Alois Pískala, Prague, Czechoslovakia, assignors to Ceskoslovenska akademie ved, Prague, Czechoslovakia
No Drawing. Filed Dec. 14, 1964, Ser. No. 418,273
Claims priority, application Czechoslovakia,
Dec. 22, 1963, 7,093/63
10 Claims. (Cl. 260—211.5)

The present invention relates to a process for the manufacture of 1-glycosyl-5-azacytosines of the general formula

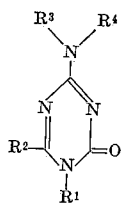

I wherein $R^1$ represents a glycosyl or peracylglycosyl residue, $R^2$ represents a hydrogen atom or an alkyl group with 1–4 carbon atoms, $R^3$ and $R^4$ (different or identical) represent hydrogen atoms or alkyl groups containing 1–4 carbon atoms, or aralkyl groups, e.g., a benzyl group, eventually substituted in the benzene ring.

Our investigations have shown that 1 - glycosyl.5-azacytosines possess remarkable cancerostatic and virostatic properties. To our best knowledge, the aforesaid compounds have not been recorded hitherto in the literature. Especially, 5-azacytidine was found to interfere very effectively with the metabolism of nucleis acids of quickly growing biological systems.

The process for the manufacture of the compounds aforesaid was disclosed in the Czechoslovak Patent No. 114,716 and comprises reacting peracylglycosyl isocyanates with O-alkylisoureas, thereby forming 1-peracylglycosyl - 4 - alkylisobiurets, and condensing the latter with orthoesters of aliphatic acids to produce 1-peracylglycosyl - 4 - alkoxy - 2 - oxo - 1,2 - dihydro - 1,3,5-triazines. The latter are transformed into 1 - peracylglycosyl derivatives of 5 - azacytosine which, on alcoholysis or ammonolysis afford the corresponding 1-glycosyl-5-azacytosines.

Later on, our experiments have shown that 1 - glycosyl-5-azacytosines may be prepared from cheaper starting compounds in improved yields by simple procedures. This novel method is disclosed in the present invention.

By way of a comprehensive statement, the process of the invention is concerned with the preparation of 1-glycosyl - 5 - azacytosines of the general Formula I, which process comprises reacting peracylglycosyl isocyanates of the general formula $$R^1-N=C=O$$

II wherein $R^1$ represents peracylglycosyl, with S-alkylisothioureas of the general formula

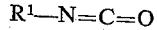

III wherein $R^5$ represents an alkyl group possessing 1–4 carbon atoms of an aralkyl group, thereby forming peracylglycosylisothiobiurets of the general formula

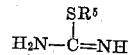

IV wherein $R^1$ represents peracylglycosyl and $R^5$ represents the same as in the Formula III; condensing the latter with orthoesters of aliphatic acids of the general formula $$R^2-C(OR^6)_3$$

V wherein $R^2$ represents the same as in the Formula I and $R^6$ represents a methyl or an ethyl group, thereby forming 1 - peracyl-glycosyl - 5 - alkylmercapto - 2 - oxo-1,2-dihydro-1,3,5-triazines of the general formula

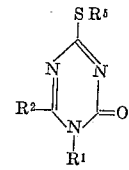

VI wherein $R^1$ represents the same as in the Formula IV, $R^2$ represents the same as in the Formula I, $R^5$ represents the same as in the Formula III; reacting the latter with a compound of the general formula $$R^3-NH-R^4$$

VII wherein $R^3$ and $R^4$ represent the same as in the Formula I, thereby forming compounds of the general Formula I, which, if required, are subjected to alcoholysis is preferably by the action of methanol in the presence of sodium methylate, or to ammonolysis preferably by the action of ammonia in methanol.

According to the process provided by the invention, the compounds of the general Formula II are reacted with compounds of the general Formula III at lower temperatures in an equimolecular ratio in inert solvents preferably in chloroform or acetone.

Furthermore, condensation of the compounds of the general Formula IV with orthoesters of aliphatic acids of the general Formula V is performed at elevated temperatures, but lower than the boiling point of the orthoester used, in a stream of an inert gas.

Finally, the reaction of the compounds of the general Formula IV with a compound of the general Formula VII is carried out at room temperature in the presence of an alkanol possessing 1–6 carbon atoms.

The process provided by the invention described above does not affect the configuration at the glycosidic center so that the product possesses the same configuration as the starting compound of the general Formula II.

According to the nature of the groups protecting the hydroxylic functions, the replacement of the residue —$SR^5$ in the compound of the general Formula VI with the group $R^3$—N—$R^4$ (thereby forming the compound of the general Formula I) may be accompanied with a simultaneous removal of the protecting groups aforesaid. If present in the final product, the protecting groups can be removed by known convenient methods.

The process provided by the invention is further disclosed in the following examples which are illustrative but not limitative thereof:

Example 1.—1-(2,3,5-tri-O-acetyl-β-D-ribofuranosyl)-4-methyl-4-isothiobiuret

A solution of crude 2,3,5-tri-O-acetyl-β-D-ribofuranosyl isocyanate (3.35 g.) in anhydrous acetone (50 ml.) was treated under cooling and mechanical stirring under exclusion of atmospheric moisture with a solution of S-methylisothiourea (0.90 g.) in anhydrous acetone (30 ml.). The resulting solution was allowed to stand at room temperature for the period of 20 minutes and then evaporated under diminished pressure. The resulting thick sirup was dissolved in anhydrous acetone and the solution was precipitated with anhydrous light petroleum (50 ml.). After 30 minutes of standing at room temperature, the colourless supernatant liquid was decanted and allowed to stand in an open vessel for the period of three to four hours to deposit colourless needles of the product (0.4 g.). The lower syrupy layer was dissolved in anhydrous acetone (10 ml.) and the solution treated dropwise with stirring with light petroleum till turbid. On inoculation, the crystalline product began to separate. The next day, the crystals were collected and the mother liquor concentrated to afford another crop of the product. Total yield of 1-(2,3,5-tri-O-acetyl-β-D-ribofuranosyl) - 4 - methyl-4-isothiobiuret 3.31 g. (85%, based on S-methylisothiourea), M.P. 138–139° C. (ethanol).

*Example 2.—1-(2,3,5-tri-O-acetyl-β-D-ribofuranosyl)-4-methylmercapto-2-oxo-1,2-dihydro-1,3,5-triazine*

A solution of 1-(2,3,5-tri-O-acetyl-β-D-ribofuranosyl)-4-methyl-4-isothiobiuret (3.91 g.) in ethyl orthoformate (50 ml.) was heated at 135° C. in a distillation apparatus in a slow stream of dry nitrogen for the period of eight hours. On cooling, the solution was precipitated with anhydrous light petroleum (250 ml.). The resulting sirupous precipitate was dissolved in anhydrous benzene (10 ml.) and the solution was precipitated with light petroleum (50 ml.). This purification was repeated once more and the sirup was dried under diminished pressure. Yield of the glassy 1-(2,3,5-tri-O-acetyl-β-D-ribofuranosyl)-4-methylmercapto-2-oxo-1,2-dihydro-1,3,5-triazine 3.05 g. (75%), $$\lambda_{max.}^{CH_3CN} \ 275 \ m\mu \ (\log \epsilon \ 4.10)$$

*Example 3.—5-azacytidine*

1-(2,3,5-tri-O-acetyl-β-D - ribofuranosyl) - 4 - methylmercapto-2-oxo-1,2-dihydro-1,3,5-triazine (4.01 g.) was dissolved in anhydrous methanol (30 ml.) previously saturated at 0° C. with dry ammonia and the resulting solution was allowed to stand in a sealed vessel at room temperature for the period of twelve hours. The precipitate was collected, washed with methanol and dried under diminished pressure. Yield 1.65 g. (68%) of 5-azacytidine, M.P. 230–231° C. (decomposition).

*Example 4.—1-(3,5-di-O-p-toluyl-2-deoxy-β-D-ribofuranosyl)-4-isothiobiuret*

A solution of crude 3,5-di-O-p-toludyl-1,2-deoxy-β-D-ribofuranosyl isocyanate (3.95 g.) in anhydrous ether (50 ml.) was treated with cooling and stirring under exclusion of atmospheric moisture with a solution of S-methylisothiourea in anhydrous acetone (30 ml.). The resulting solution was allowed to stand at room temperature for the period of 20 minutes and evaporated under diminished pressure. The residual sirup was dissolved in absolute ether (10 ml.) and the solution was treated under stirring with small portions of light petroleum till turbid. On trituration with a glass rod the solution began to deposit crystals. The next day, the product was collected and washed with a small amount of ether. The mother liquors were treated with additional light petroleum and the mixture containing the partly precipitated sirup was inoculated. After two days of standing at room temperature under occasional stirring, the sirup solidified and the supernatant deposited another crop of crystals. Total yield of 1-(3,5-di-O-p-toluyl-2-deoxy-β-D-ribofuranosyl)-4-methyl-4-isothiobiuret 3.90 g. (80%), M.P. 169–171° C. (ethanol).

*Example 5.—1-(3,5 - di - O-p-toluyl-2-deoxy-β-D-ribofuranosyl)-4-methyl-mercapto-2-oxo-1,2-dihydro-1,3,5-triazine*

A solution of 1 - (3,5-di-O-p-toluyl-2-deoxy-β-D-ribofuranosyl) - 4 - methyl-4-isothiobiuret (4.85 g.) in ethyl orthoformate (40 ml.) was heated in a distillation apparatus at 135° C. in a slow stream of dry nitrogen for the period of eight hours. After 60 minutes of heating, the reaction mixture began to deposit crystals. The next day, the product was collected and washed with a small amount of absolute ether. The mother liquors were concentrated under diminished pressure to one fourth of their original volume and the concentrate was treated under stirring with anhydrous light petroleum (50 ml.). The mixture was allowed to stand for a short time and the supernatant was decanted. The sirupous residue was dissolved in absolute ether (10 ml.), the solution was inocculated and allowed to stand overnight in an ice-box. Total yield 3.5 g. (71%) of 1-(3,5-di-O-toluyl-2-deoxy-β - D - ribofuranesyl)-4-methylmercapto-2-oxo-1,2-dihydro-1,3,5-triazine, M.P. 201–202° C.

*Example 6.—2′-deoxy-5-azacytidine*

A suspension of finely powdered 1-(3,5-di-O-p-toluyl-2-deoxy-β-D-ribofuranesyl)-4-methylmercapto-2-oxo-1,2-dihydro - 1,3,5 - triazine (4.95 g.) in absolute methanol (500 ml.) previously saturated at 0° C. with dry ammonia was allowed to stand under occasional stirring in a closed vessel at room temperature for the period of 24 hours. A small amount of precipitate was removed by filtration and the filtrate was evaporated under diminished pressure. The residue was triturated with three 50 ml. portions of absolute ether and then crystallised from anhydrous methanol to give 1.32 g. (58%) of 2′-deoxy-5-azacytidine, M.P. 198–199° C. (decomposition).

*Example 7.—1 - (2,3,4,6-tetra-O-acetyl-β-D-glucopyranosyl)-4-methyl-4-isothiobiuret*

A solution of 2,3,4,6-tetra-O-acetyl-β-D-glucopyranosyl-isocyanate (3.73 g.) in absolute acetone (50 ml.) was treated with cooling and mechanic stirring under exclusion of atmospheric moisture with a solution of S-methylisothiourea (0.90 g.) in absolute acetone (30 ml.). The resulting solution was allowed to stand at room temperature for the period of 20 minutes and evaporated under diminished pressure. The residual thick sirup was dissolved in anhydrous benzene (10 ml.) and the solution was precipitated by the addition of anhydrous light petroleum (50 ml.). The precipitate was thoroughly triturated with a glass rod till a white amorphous powder was obtained. The solid was collected, thoroughly washed with light petroleum and dried under diminished pressure to give 4.2 g. (91%) of 1 - (2,3-4-6-tetra-O-acetyl-β-D-glucopyranosyl)-4-methyl-4-isothiobiuret, an amorphous solid, melting unsharply between 90–100° C., $$\lambda_{max.}^{EtOH} \ 244 \ m\mu \ (\log \epsilon \ 4.30)$$

*Example 8.—1 - (2,3,4,6 - tetra - O-acetyl - β-D-glucopyranosyl) - 5 - methylmercapto-2-oxo-1,2-dihydro-1,3,5-triazine*

A solution of 1 - (2,3,4,6-tetra-O-acetyl-β-D-glucopyranosyl)-4-methyl-4-isothiobiuret (4.63 g.) in ethyl orthoformate (50 ml.) was heated in a distillation apparatus at 135° C. in a slow stream of dry nitrogen for the period of eight hours. After thirty minutes of heating, the solution began to deposit the product. The next day, the solid was collected and washed with a small amount of absolute ether to give 3.21 g. (68%) of 1-(2,3,4,6-tetra-O-acetyl-β - D-glucopyranosyl)-4-methylmercapto-2-oxo-1,2-dihydro-1,3,5-triazine, M.P. 269° C.

*Example 9.—1-β-D-glucopyranosyl-5-azacytosine*

A solution of 1 - (2,3,4,6-tetra-D-acetyl-β-D-glucopyranosyl) - 4 - methylmercapto - 2-oxo-1,2-dihydro-1,3,5-triazine (4.73 g.) in absolute methanol (40 ml.) previously saturated at 0° C. with dried ammonia was allowed to stand at room temperature in a sealed vessel for the period of eight hours. The solution was then evaporated under diminished pressure and the residual thick sirup was triturated with three 50 ml. portions of absolute ether. The white amorphous solid was dissolved in a minimum amount of absolute methanol and the resulting solution was allowed to stand at room temperature overnight. The next day, the product was collected, washed with methanol and dried under diminished pressure to give 1.65 g. (60%) of 1-β-D-glucopyranosyl-5-azacytosine, M.P. 260–262° C. (decomposition).

What we claim is:

1. A process of preparing 1-glycosyl-5-azacytosines of the general formula

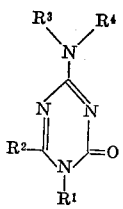

wherein $R^1$ represents glycosyl or peracylglycosyl, $R^2$ represents an atom of hydrogen or an alkyl having 1–4 carbon atoms, $R^3$ and $R^4$ may be the same or different and represent hydrogen or alkyl having 1–4 carbon atoms, or aralkyl, which process comprises reacting peracylglycosyl isocyanates of the general formula $$R^1\text{---}N\text{=}C\text{=}O \qquad \text{II}$$

wherein $R^1$ represents peracylglycosyl, with S-alkylisothioureas of the general formula

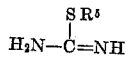

wherein $R^5$ represents an alkyl group having 1–4 carbon atoms, thereby forming peracylglycosylisothiobiurets of the general formula

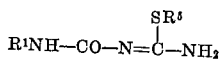

wherein $R^1$ represents peracylglycosyl and $R^5$ represents the same as in the Formula III; condensing the latter with orthoesters of aliphatic acids of the general formula $$R^2\text{---}C(OR^6)_3 \qquad \text{V}$$

wherein $R^2$ represents the same as in the Formula I and $R^6$ represents a methyl or an ethyl group, thereby forming 1 - peracylglycosyl - 4 - alkylmercapto - 2 - oxo - 1,2-dihydro-1,3,5-triazines of the general formula

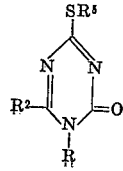

wherein $R^1$ represents the same as in the Formula IV, $R^2$ represents the same as in the Formula I, $R^5$ represent the same as in the Formula III; and reacting the latter with a compound of the general formula $$R^3\text{---}NH\text{---}R^4 \qquad \text{VI}$$

wherein $R^3$ and $R^4$ represents the same as in the Formula I, to produce the compounds of the general Formula I.

2. A process as defined in claim 1 which comprises reacting the compounds of the general Formula II with compounds of the general Formula III in an equimolecular ratio and in an inert solvent.

3. A process as defined in claim 1 which comprises condensing compounds of the general Formula IV in a stream of inert gas with orthoesters of aliphatic acids of the general Formula V, at elevated temperatures but lower than the boiling point of the orthoester used.

4. A process as defined in claim 1 which comprises reacting compounds of the general Formula VI with a compound of the general Formula VII at room temperature in the presence of an alkanol having 1–6 carbon atoms.

5. A process as defined in claim 1, wherein said aralkyl is benzyl.

6. A process as defined in claim 1, wherein the thus produced compound of the general Formula I is subjected to alcoholysis.

7. A process as defined in claim 6, wherein said alcoholysis is carried out by the action of methanol in the presence of sodium methylate.

8. A process as defined in claim 1, wherein the thus produced compound of the general Formula I is subjected to ammonolysis.

9. A process as defined in claim 8, wherein said ammonolysis is carried out by the action of ammonia in methanol.

10. A process as defined in claim 2, wherein said inert solvent is selected from the group consisting of chloroform and acetone.

No references cited.

LEWIS GOTTS, *Primary Examiner.*

J. R. BROWN, *Assistant Examiner.*